(12) United States Patent
Verma et al.

(10) Patent No.: US 12,041,198 B2
(45) Date of Patent: *Jul. 16, 2024

(54) RING AND HARDWARE CHARACTERISTIC IDENTIFICATION TECHNIQUES TO IDENTIFY CALL DEVICES

(71) Applicant: WELLS FARGO BANK, N.A., San Francisco, CA (US)

(72) Inventors: Ashutosh Verma, Bangalore (IN); Naveen Gururaja Yeri, Bangalore (IN); Shitiz Gupta, Bangalore (IN); Divakar Vijayan, Bangalore (IN); Manpreet Singh, Hyderabad (IN); Vinoth Venkataraman, Bangalore (IN); Ramesh Babu, Bangalore (IN); Nihar Swain, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,056

(22) Filed: May 23, 2023

(65) Prior Publication Data
US 2023/0300242 A1  Sep. 21, 2023

Related U.S. Application Data

(63) Continuation of application No. 17/677,552, filed on Feb. 22, 2022.

(51) Int. Cl.
*H04M 3/00* (2024.01)
*G06F 18/22* (2023.01)
(Continued)

(52) U.S. Cl.
CPC .......... *H04M 3/2281* (2013.01); *G06F 18/22* (2023.01); *G06N 20/00* (2019.01); *H04M 3/42357* (2013.01)

(58) Field of Classification Search
CPC ............ H04M 3/2281; H04M 3/42357; G06N 20/00; G06F 18/22
(Continued)

(56) References Cited

U.S. PATENT DOCUMENTS 5,359,328 A  10/1994  Sills
5,442,694 A  8/1995  Chitrapu et al.
(Continued)

OTHER PUBLICATIONS

Hasan, et al., "Smart Telephone Design—Caller Identification and Answering Machine," IEEE International Conference on Semiconductor Electronics (ICSE) Proceedings held Nov. 1998 in Bangi, Malaysia, Nov. 1998, pp. 217-222, IEEE.
(Continued)

*Primary Examiner* — William J Deane, Jr.
(74) *Attorney, Agent, or Firm* — Kilpatrick Townsend & Stockton LLP

(57) ABSTRACT

A voice communications computer system ("VCCS") receives a ring signal from a call device having unverified device identification data. The VCCS identifies an audible frequency component and an electronic frequency component of the ring signal. The VCCS identifies a device identification characteristic or a geographic location characteristic based on the audible or electronic frequency components, and identifies a stored identification characteristic associated with the device identification data. Based on a comparison of the stored identification characteristic with the device identification characteristic or geographic location characteristic, the VCCS generates fraud estimation data. In some cases, the VCCS generates call status data based on the fraud estimation data. The VCCS provides the fraud estimation data or the call status data to a user interface device, which is configured to display data or perform a call action for a call associated with the ring signal.

20 Claims, 5 Drawing Sheets

(51) Int. Cl.
*G06N 20/00* (2019.01)
*H04M 3/22* (2006.01)
*H04M 3/42* (2006.01)

(58) Field of Classification Search
USPC .......................... 379/188, 189, 210.01, 180
See application file for complete search history.

(56) References Cited

U.S. PATENT DOCUMENTS

| | | | |
|---|---|---|---|
| 5,787,159 | A | 7/1998 | Hamilton et al. |
| 5,796,073 | A | 8/1998 | Mattis et al. |
| 5,907,596 | A | 5/1999 | Karnowski |
| 7,734,033 | B2 | 6/2010 | Aupperle et al. |
| 7,991,134 | B2 | 8/2011 | Kim |
| 8,064,578 | B2 | 11/2011 | Silver et al. |
| 8,774,872 | B2 | 7/2014 | Wang et al. |
| 8,781,108 | B2 | 7/2014 | Pedersen |
| 9,060,057 | B1 | 6/2015 | Danis |
| 2003/0017860 | A1 | 1/2003 | Choi |
| 2003/0108189 | A1 | 6/2003 | Barzani |
| 2004/0086101 | A1 | 5/2004 | Katz |
| 2011/0022683 | A1 | 1/2011 | Johan et al. |
| 2011/0211683 | A1 | 9/2011 | Trell et al. |
| 2014/0170981 | A1 | 6/2014 | Yu et al. |
| 2019/0007377 | A1 | 1/2019 | Bender |
| 2019/0295203 | A1 | 9/2019 | Cho et al. |
| 2019/0364154 | A1 | 11/2019 | Hermanek et al. |

OTHER PUBLICATIONS

Kumar et al., "Active Volume Control in Smart Phones Based on User Activity and Ambient Noise", Sensors, Jul. 24, 2020, 17 Pages, vol. 20, No. 4117, MDPI.

Wang, "An Industrial-Strength Audio Search Algorithm," Proceedings of the 4th International Conference on Music Information Retrieval, Baltimore, Maryland, USA, Oct. 27-30, 2003, Published Jan. 2003, 7 Pages, ISMIR.

300

Receive a ring signal from a call device associated with device identification data
310

↓

Identify an audible frequency component and a electronic frequency component
320

↓

Identify a device identification characteristic or a geographic characteristic based on the electronic frequency component
330

↓

Identify a stored identification characteristic
340

↓

Generate fraud estimation data based on a comparison of the device identification characteristic and the stored identification characteristic
350

Generate fraud estimation data based on a comparison of the geographic characteristic and the stored identification characteristic
355

↓

Provide the fraud estimation data to a user interface device
360

Figure 3

RING AND HARDWARE CHARACTERISTIC IDENTIFICATION TECHNIQUES TO IDENTIFY CALL DEVICES

CROSS-REFERENCE TO RELATED APPLICATION

This application is a continuation of and claims priority to U.S. patent application Ser. No. 17/677,552 filed Feb. 22, 2022, and entitled "RING AND HARDWARE CHARACTERISTIC IDENTIFICATION TECHNIQUES TO IDENTIFY CALL DEVICES," the entirety of which is incorporated herein by reference.

TECHNICAL FIELD

This disclosure relates generally to the field of call analysis, and more specifically relates to identification of potentially fraudulent calls based on identified frequency components in a call.

BACKGROUND

A call received from a telephone or other call device can be an important piece of communication received by an organization. A call can be received from a customer, employee, or other legitimate participant of the organization. However, malicious actors can use fraudulent calls to perpetrate negative activities, such as monetary fraud, identity theft, or other illegal or illegitimate activities. It is important for organizations to quickly identify calls that may be fraudulent. In addition, it is important for organizations to accurately identify fraudulent calls, so that legitimate callers are not inappropriately prevented from accessing the organization, as an example.

A contemporary technique for identifying a call device can include encoding a calling number using frequency shift keying ("FSK"), such as FSK performed by a telecommunications service provider. However, in some cases, FSK encoding techniques are not supported by a telecommunications service provider. In addition, FSK encoding techniques may be circumvented or otherwise unavailable. It is desirable to develop additional techniques for identifying a call device from which a call is received.

SUMMARY

According to certain embodiments, a voice communications computer system receives a ring signal that originates from a call device. The call device has an association with device identification data. The voice communications computer system identifies at least one audible frequency component of the ring signal. The voice communications computer system identifies at least one electronic frequency component of the ring signal. Based on the electronic frequency component, the voice communications computer system identifies a device identification characteristic. The voice communications computer system identifies a stored identification characteristic that is associated with the device identification data. Based on a comparison of the device identification characteristic and the stored identification characteristic, the voice communications computer system generates fraud estimation data. The voice communications computer system provides the fraud estimation data to a user interface device that is configured to communicate with the voice communications computer system. In some embodiments, the voice communications computer system generates call status data responsive to determining that the fraud estimation data exceeds a verification threshold. The call status data configures the user interface device to perform one or more of configuring a display device or disconnecting a call associated with the ring signal.

In some embodiments, the voice communications computer system identifies a geographical location characteristic based on the audible frequency component or the electronic frequency component. The fraud estimation data is generated based further on an additional comparison of the geographic location characteristic and the stored identification characteristic.

These illustrative embodiments are mentioned not to limit or define the disclosure, but to provide examples to aid understanding thereof. Additional embodiments and further descriptions are discussed in the Detailed Description.

BRIEF DESCRIPTION OF THE DRAWINGS

Features, embodiments, and advantages of the present disclosure are better understood when the following Detailed Description is read with reference to the accompanying drawings, where:

FIG. 3 is a flow chart depicting an example of a process for call analysis, such as identification of a call device based on associated frequency components, according to certain embodiments;

DETAILED DESCRIPTION

Figure 1:
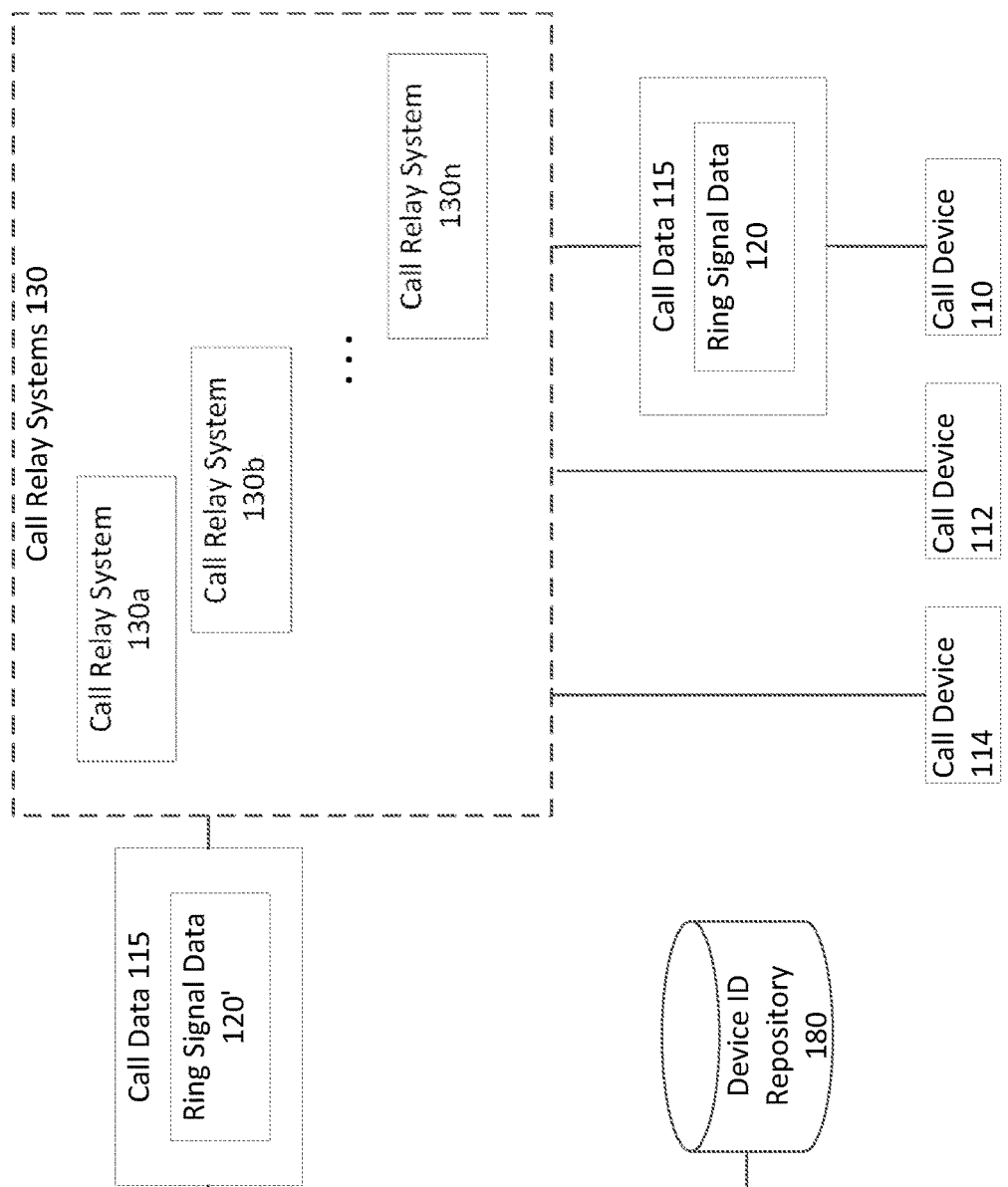
FIG. 1 is a block diagram depicting an example of a computing environment in which calls may be transmitted among call devices and with a voice communication computing system, according to certain embodiments.

As discussed above, contemporary techniques for identifying a call device can be circumvented or otherwise unavailable. For example, frequency shift keying ("FSK") encoding may be unsupported by some telecommunication service providers. In addition, malicious actors could circumvent FSK encoding techniques to hide or falsify an identification number associated with a call device, e.g., via caller ID "spoofing" techniques. In some cases, malicious actors circumvent call identification techniques by hiding or falsifying a geographical area associated with a call device, such as by providing a false area code, country code, or other geographical indicator. In some cases, contemporary techniques for identifying a call device may be insufficient to accurately identify a geographical area associated with a call device.

Certain embodiments described herein provide techniques to identify a call device or a geographical location of a call device based on frequency components associated with the call device. The frequency components include particular frequencies or patterns of frequencies that are received during a call with the call device. For example, a call device is associated with frequency components generated by hardware included in the call device and additional frequency components generated by telecommunications systems that relay the call from the call device. The combination of frequency components received during a particular call are matched to a stored identification characteristic. The stored identification characteristic describes frequency components of previous calls associated with an identification number (e.g., telephone number) for the call. In addition, the combination of frequency components may be matched to a geographic location characteristic associated with previous calls received from a particular geographic area. If the combination of frequency components for the particular call does not match the stored identification characteristic, or if the combination does not match the geographic location characteristics associated with the telephone number, alert data may be generated and sent to an additional device. For example, an alert may be sent to a computer display used by a person, such as a customer service representative, who is speaking with the potentially fraudulent caller.

In some cases, a particular combination of frequency components generated by the call device and the relaying telecommunications systems identifies the call device or a geographical location with a relatively high degree of accuracy. Identifying a call device or geographical location based on the particular combination of frequency components can offer improved identification accuracy as compared to contemporary techniques. In addition, the particular combination of frequency components is very difficult to falsify. Identifying a call device or geographical location based on the particular combination of frequency components can reduce fraud associated with spoofing or other circumvention techniques. For example, a computing system, such as a VCCS, that uses the described techniques to identify a call device or its geographical location based on associated frequency components can provide a user with improved information about the call device, such that the user could identify potential fraud more readily based on the improved information.

The following examples are provided to introduce certain embodiments of the present disclosure. In the example implementation, a voice communication computing system ("VCCS") receives call data from a call device, such as a mobile telephone. The call data includes a ring signal and device ID data, such as a telephone number. The VCCS can indicate the call data as being unverified, for example, if it is unknown whether the device ID data is "spoofed" or otherwise altered. The VCCS identifies, in the ring signal, one or more frequency components, including electronic frequency components and audible frequency components. Based on the frequency components, the VCCS identifies characteristics of the call data, such as device ID characteristics that are unique (or nearly unique) to the call device, or geographic characteristics that are unique (or nearly unique) to a geographical region in which the call device is located. In addition, the VCCS compares the call characteristics to one or more stored ID characteristics, such as characteristics determined from previously received calls. For example, the VCCS includes one or more trained machine-learning models that are configured for comparing the call characteristics and the stored ID characteristics. Based on the comparison, the VCCS determines whether the call characteristics match the stored ID characteristics. A match can be determined for the call device, such as determining whether or not the device ID characteristics match stored ID characteristics from additional calls having the same telephone number (or other device ID data). In addition, a match can be determined for the geographical region of the call device, such as determining whether or not the geographic characteristics match stored ID characteristics from additional calls originating from the geographical region associated with the telephone number, e.g., a region for an area code or country code of the telephone number.

Continuing with this example, the VCCS generates fraud estimation data for the call data. The fraud estimation data indicates a likelihood that the telephone number (or other device ID data) described by the call data is spoofed or otherwise altered. Based on the fraud estimation data, the VCCS generates call status data, which could include alert data (e.g., indicating the call is potentially fraudulent) or a request for additional verification data. The VCCS provides the call status data to a user interface device (e.g., a computer workstation, an additional call device) that is configured to provide a person with information about the incoming call from the call device. The person using the user interface device may be able to more accurately decide how to handle the call based on the call alert data, such as how to handle a potentially fraudulent call. In some cases, the call status data can include a disconnection command, such that the user interface device is configured to automatically disconnect a potentially fraudulent call.

In some implementations, examples of a call device can include a telephone, such as a mobile telephone, a smartphone, a landline-based telephone, or other types of devices configured for placing and receiving telephone calls. In some cases, a call device can include a computing system that is configured to provide telephone calling functions, such as a computer that includes software for voice over internet protocol ("VoIP") telephone functions.

Certain embodiments described herein provide improved techniques for identifying a call device or a geographical location of a call device. In addition, certain embodiments described herein provide improved techniques for preventing fraud associated with circumventing call identification techniques or location identification techniques. For example, a voice communication computing system can utilize particular rules to filter and identify frequency components associated with a particular call device. In addition, the voice communication computing system can utilize additional rules to determine whether the identified frequency components match identification characteristics that are associated with previous calls, such as a stored identification characteristic or a geographical location characteristic. In some implementations, a voice communication computing system using techniques described herein can identify a call device or geographical location of a call device with improved accuracy as compared to contemporary techniques for call/location identification. In addition, the voice communication computing system using techniques described herein can reduce fraud associated with spoofing or other attempts to circumvent contemporary call/location identification techniques.

Referring now to the drawings, FIG. 1 is an example of a computing environment in which calls may be transmitted among call devices, such as a call transmission environment 100. In implementations described herein, the term "call" may refer to a voice-based communication among two or more callers. In some cases, a call can include video communication in addition to voice communication (e.g., "video call"). Calls can include telephone calls, such as calls serviced by mobile or landline telecommunication service providers. In addition, calls can include VoIP calls, such as calls serviced by VoIP service providers.

The call transmission environment 100 includes one or more call devices, such as a call device 110, a call device 112, or a call device 114. In addition, the call transmission environment 100 includes one or more call relay systems, such as a call relay system 130a, a call relay system 130b, and additional call relay systems including a call relay system 130n (collectively referred to herein as call relay systems 130). In addition, the call transmission environment 100 includes a voice communication computing system ("VCCS") 140. The VCCS 140 may comprise one or more computing systems that are configured to receive, provide, or otherwise route calls. As a non-limiting example, the VCCS 140 could be associated with a customer service call center, such that calls received and sent by customer service representatives (or other participants of the call center) are routed via the VCCS 140. For example, calls between the call devices 110, 112, or 114 and the example customer service call center could be received by the VCCS 140. In addition, the VCCS 140 could route the received calls to respective call devices associated with customer service representatives, such as call devices at workstations used by the customer service representatives to handle calls and perform service tasks for callers. For convenience, and not by way of limitation, the VCCS 140 is described as receiving calls, sending calls, handling calls, routing calls, or other comparable terms, and these terms shall be understood to include calls routed by the VCCS to an additional call device, even if the VCCS 140 does not itself participate in voice communications exchanged during calls.

In the call transmission environment 100, calls between the call devices 110, 112, or 114 and the VCCS 140 (e.g., calls routed or otherwise handled by the VCCS 140) are relayed by one or more of the call relay systems 130. The call relay systems 130 can include call equipment associated with, for instance, telecommunications service providers or VoIP service providers, such as call exchanges, gateways, radio frequency towers for mobile service, physical lines (e.g., metal, fiber optic) configured to connect additional equipment, or other types of call equipment configured to direct very high volumes of calls. In some cases, the call relay systems 130 include hardware-based call equipment, software-based call equipment, or a combination of software and hardware. For example, the call relay system 130n could include a gateway with specialized hardware to service a high volume of calls, where the gateway is configured with software to direct the high volume of calls.

In FIG. 1, the call device 110 initiates a call to the VCCS 140. For example, the call device 110 generates call data 115, such as data that describes audio, video, or other information transmitted during the call. In addition, the call data 115 includes ring signal data 120. The ring signal data 120 includes information that indicates the initiated call is directed to the VCCS 140. In addition, the ring signal data 120 indicates a device identification number associated with the call device 110, such as a telephone number, internet protocol address ("IP address"), or other identification number. In some cases, the device identification number indicated by the ring signal data 120 may be considered unverified. For example, the ring signal data 120 may or may not be modified to indicate a device identification number that is different (e.g., spoofed) from an identification number for the call device 110.

In the call transmission environment 100, the call initiated by the call device 110 could be relayed by one or more of the call relay systems 130. In addition, the ring signal data 120 includes frequency components that are modified by various devices that generate or relay the initiated call. Modifications of the ring signal data 120, such as ring signal data 120' or ring signal data 120", may include (or omit) additional frequency components that are generated (e.g., created or suppressed) by devices or systems that transmit or otherwise interact with the ring signal data 120, 120', or 120" during the call.

For example, the ring signal data 120 includes frequency components that are generated by a particular configuration of hardware included within the call device 110. As an example, the call device 110 may include a type of operational amplifier ("op-amp") that produces a pattern of frequencies (e.g., cut-offs, clipping) in the ring signal data 120. As an additional example, the call device 110 may include conductive connections (e.g., wires, traces) that generate an additional pattern of frequencies (e.g., cross-talk) in the ring signal data 120. Other examples of hardware configurations that could produce frequency components in the ring signal data 120 include transistors, microprocessors, modems, speakers, microphones, conductive connections on a circuit board, positioning of hardware items on a circuit board, and other configurations of hardware items associated with the call device 110. In some cases, frequency components in the ring signal data 120 are affected by relatively minor variations in hardware configurations, such as variations in model number, manufacturing processes, relative age of hardware items, or other variations of hardware configurations, including variations among hardware items that conform to a particular standard (e.g., variations among integrated circuits that conform to a 555 timer standard).

In addition, the ring signal data 120 includes frequency components that are generated by a particular configuration of software included within the call device 110. For instance, the call device 110 utilizes software that is configured to improve (or otherwise modify) audio quality of calls. As an example, the call device 110 may utilize software that reduces electronic noise (e.g., filters frequency components generated by hardware of the call device 110), reduces audible background noise, compresses audio or additional data related to the call, or other techniques performed by software configurations in the call device 110. In some cases, frequency components in the ring signal data 120 are affected by relatively minor variations in software configurations, such as variations in version number, settings, interactions with additional software (e.g., interactions between operating system and audio filtering software), or other variations of software items, including variations among software configurations that conform to a particular standard (e.g., variations among software packages that conform to a wideband audio encoding standard).

In some cases, the call device 110 could include a signature-generation module that is configured to generate one or more frequency components that are particular to the call device 110, such that the call device 110 provides the generated frequency components as a unique (or nearly unique) frequency signature. The signature-generation module could generate the frequency signature via a hardware configuration, a software configuration, or a combined configuration of software and hardware. In some cases, the example frequency signature could be provided in combination with additional frequencies from the call device 110 (e.g., a combination of an audio signal and the frequency signature). In addition, the example frequency signature could be provided as a separate signal from the call device 110, such as by transmission of an additional frequency signal (e.g. transmitted separately from an audio signal), a data packet provided via a control channel, or another suitable technique to provide a frequency signature. In some cases, the frequency signature of the call device 110 is included in, or otherwise provided with, the ring signal data 120.

The call data 115, including the ring signal data 120, is received by one or more of the call relay systems 130. In addition, the ring signal data 120 is modified to the ring signal data 120' by the call relay systems 130. For example, the ring signal data 120' includes frequency components that are generated by a particular configuration of the one or more call relay systems 130 that transmit the call data 115. As an example, the call relay systems 130 may include devices with hardware configurations or software configurations (such as described in regards to the call device 110) that produce a pattern of frequencies in the ring signal data 120'. For example, the ring signal data 120' may include frequency components generated via gateways, exchanges, servers (or other devices) configured with hardware and/or software for handling a high volume of calls, or other telecommunications (or VoIP) equipment. As an additional example, the call relay systems 130 may be connected in configurations that produce a pattern of frequencies in the ring signal data 120', such as frequency components generated via antennae of mobile radio towers, physical lines, or other types of connections within or among one or more of the call relay systems 130. In some cases, frequency components in the ring signal data 120' are affected by relatively minor variations in hardware configurations, software configurations, or connection configurations, including variations among configurations that conform to a particular standard (e.g., variations among call relay systems that conform to a 3G mobile telecommunications standard). In some cases, at least one of the call relay systems 130 could include a signature-generation module that is configured to generate one or more frequency components that are particular to the at least one call relay system, such that the at least one call relay system provides the generated frequency components as a unique (or nearly unique) frequency signature. The signature-generation module could generate the frequency signature via a hardware configuration, a software configuration, or a combined configuration of software and hardware. In some cases, the example frequency signature could be provided in combination with additional frequencies from the at least one call relay system (e.g., a combination of an audio signal and the frequency signature). In addition, the example frequency signature could be provided as a separate signal from the at least one call relay system, such as by transmission of an additional frequency signal (e.g. transmitted separately from an audio signal), a data packet provided via a control channel, or another suitable technique to provide a frequency signature. In some cases, the frequency signature of the at least one call relay system is included in, or otherwise provided with, the ring signal data 120'.

The call data 115, including the ring signal data 120', is received by the VCCS 140. In addition, the ring signal data 120' is further modified to the ring signal data 120" by the VCCS 140. For example, the ring signal data 120" includes frequency components that are generated by a particular configuration of the VCCS 140. As an example, the VCCS 140 may include devices with hardware configurations or software configurations (such as described in regards to the call device 110 or the call relay systems 130) that produce a pattern of frequencies in the ring signal data 120". For example, the ring signal data 120" may include frequency components generated via gateways, servers (or other devices) configured with hardware and/or software for handling calls, or other equipment included in the VCCS 140.

In some cases, equipment of the VCCS 140 may be connected in configurations that produce a pattern of frequencies in the ring signal data 120", such as frequency components generated via physical lines, wireless communication techniques (e.g., WiFi, Bluetooth), or other connections within the VCCS 140. In some cases, frequency components in the ring signal data 120" are affected by relatively minor variations in hardware configurations, software configurations, or connection configurations, including variations among configurations that conform to a particular standard (e.g., variations among voice communication computing systems that conform to a standard for automatic call distribution systems). In some cases, the VCCS 140 or an additional system configured to handle calls received by the VCCS 140, such as an automatic call distribution system, could include a signature-generation module that is configured to generate one or more frequency components that are particular to the VCCS 140 or the additional system, such that the VCCS 140 or the additional system provides the generated frequency components as a unique (or nearly unique) frequency signature. The signature-generation module could generate the frequency signature via a hardware configuration, a software configuration, or a combined configuration of software and hardware. In some cases, the example frequency signature could be provided in combination with additional frequencies from the VCCS 140 or the additional system (e.g., a combination of an audio signal and the frequency signature). In addition, the example frequency signature could be provided as a separate signal from the VCCS 140 or the additional system, such as by transmission of an additional frequency signal (e.g. transmitted separately from an audio signal), a data packet provided via a control channel, or another suitable technique to provide a frequency signature. In some cases, the frequency signature of the VCCS 140 or the additional system is included in, or otherwise provided with, the ring signal data 120".

In FIG. 1, the frequency components included in or introduced to the ring signal data 120, 120', or 120" could be audible or inaudible to human hearing. In addition, the frequency components included in or introduced to the ring signal data 120, 120', or 120" may include audible frequency components, electronic frequency components, or a combination of audible and electronic frequency components. For example, an audible frequency component includes frequencies (or patterns of frequencies) that are within a typical range of human hearing, e.g., a range of approximately 20 Hz to approximately 20 kHz. In addition, an electronic frequency component may include frequencies (or patterns of frequencies) that are inaudible to typical human hearing, such as an electronic frequency component generated via oscillations of voltage, current, or other electrical values; clipping of a signal via an op-amp or other hardware; notch or band filtering implemented via hardware or software; or other types of electronic frequency components that are not detectible via typical human hearing. In some cases, an electronic frequency component could be converted to an audible frequency component, such as via a speaker device. An example of a converted frequency component could include a "buzz" (e.g., an electrical signal at 60 Hz) or other type of sound that is within a typical range of human hearing. In some cases, a frequency component, such as in the ring signal data 120, 120', or 120", could include a pattern of transmission (or retransmission). For instance, an encoder or other data conversion equipment (including hardware, software, or a combination thereof) could generate data having a particular pattern of errors. As an example, an analog-to-digital encoder in the call device 110 could generate digital data packets based on analog data (e.g., audio) received by a microphone in the call device 110. In addition, the example analog-to-digital encoder could introduce errors in the digital data, such as dropped packets or poorly encoded data. The example analog-to-digital encoder or other sources of data errors in the call device 110 could generate a pattern of retransmission, such as packets that are retransmitted subsequent to an error being detected in the packet. A frequency component in the ring signal data 120 can include the example pattern of retransmission. Additional frequency components in the ring signal data 120' or 120" could include respective patterns of transmission (or retransmission) generated by errors in the call relay system 130 or the VCCS 140.

In the call transmission environment 100, the VCCS 140 receives the call data 115, including the ring signal data 120". Based on the call data 115, the VCCS 140 determines device ID data, such as a telephone number, a user ID associated with a VoIP service, or other identification data associated with the call data 115. In some cases, the VCCS 140 generates an indication that the device ID data is unverified. For example, an "unverified" data flag (or other type of indication) indicates that the call data 115 appears to originate from a call device having the device ID data and further indicate that the originating call device is unverified. The "unverified" data flag could be used, for example, to indicate that the call device originating the call data 115 (e.g., the call device 110) may or may not have provided a spoofed telephone number, or otherwise falsified device ID data.

In addition, the VCCS 140 determines one or more frequency components 125 that are included in the ring signal data 120". For example, the VCCS 140 provides the ring signal data 120" to a signal filtering module 150. The signal filtering module 150 extracts the frequency components 125 from the ring signal data 120", such as via signal filtering techniques. Based on the frequency components 125, the VCCS 140 determines one or more characteristics associated with the ring signal data 120", such as a device identification characteristic 155. In some cases, the device ID characteristic 155 is unique (or nearly unique) to a combination of particular call device and particular call relay systems that provide the ring signal data 120". For example, if the call data 115 is generated via the call device 110, transmitted via the call relay systems 130a and 130b (e.g., but not via additional ones of the call relay systems 130), and received via the VCCS 140, the ring signal data 120" includes the frequency components 125 that are generated via the particular combination of the call device 110, the call relay system 130a, the call relay system 130b, and the VCCS 140. In addition, the frequency components 125 include a unique (or effectively unique) combination of frequency components that are generated by minor variations in the call device 110, the call relay system 130a, the call relay system 130b, and the VCCS 140, such as variations compared to others of the call relay systems 130 or the call devices 112 or 114.

In FIG. 1, the VCCS 140 performs one or more verification techniques to determine a correspondence of the device identification characteristic 155 with the device ID data from the call data 115. In addition, the VCCS 140 performs one or more verification techniques to determine a correspondence of the device identification characteristic 155 with a geographical region. For example, the VCCS 140 compares the device ID characteristic 155 to one or more stored ID characteristics 185. The stored ID characteristics 185 may be associated with additional calls associated with the device ID data, such as previous calls exchanged with a telephone number represented by the device ID data. In addition, the stored ID characteristics 185 may be associated with additional calls associated with a particular geographical region, such as previous calls exchanged with multiple telephone numbers having geographical ID data (e.g., area code, country code) that is represented by the device ID data. In some cases, the VCCS 140 receives the stored ID characteristics 185 from one or more data repositories, such as a device ID repository 180, that are included in (or otherwise in communication with) the VCCS 140.

In some implementations, a frequency component comparison module 160 that is included in the VCCS 140 receives the device ID characteristic 155 and the stored ID characteristics 185. The frequency component comparison module 160 performs one or more comparisons of frequency components that are represented by the device ID characteristic 155, e.g., the frequency components 125, with additional frequency components that are represented by the stored ID characteristics 185. Based on comparison of the frequency components, the frequency component comparison module 160 generates fraud estimation data 165. The fraud estimation data 165 indicates whether the call data 115 is verified. For example, the fraud estimation data 165 can include a value (e.g., a fraud estimation score, a percentage) that indicates a likelihood of the call data 115 originating from a same call device as additional calls having the device ID data (e.g., a telephone number that is not spoofed).

In some cases, the fraud estimation data 165 includes an indication that the device ID data is verified. For example, the VCCS 140 may modify the "unverified" data flag to a "verified" data flag. The "verified" data flag indicates that the call data 115 originates from a call device with similar frequency components as additional calls having the device ID data, e.g., the call device 110 did not spoof the device ID data.

In some cases, the fraud estimation data 165 includes an indication that the device ID data is potentially fraudulent. For example, the VCCS 140 may modify the "unverified" data flag to a "suspected fraud" data flag. The "suspected fraud" data flag indicates that the call data 115 originates from a call device with different frequency components from additional calls having the device ID data, e.g., the call device 110 spoofed the device ID data.

Based on the fraud estimation data 165, the VCCS 140 provides additional data to one or more computer systems, such as a computer system that is used by a person who is participating in the call with the call device 110. For example, the VCCS 140 could generate and send data describing a verification status of the call data 115. If the fraud estimation data 165 indicates that the device ID data is verified, the VCCS 140 generates and sends the "verified" data flag to the computer system used by the example person. If the fraud estimation data 165 indicates that the device ID data is potentially fraudulent, the VCCS 140 generates and sends the "suspected fraud" data flag to the computer system used by the example person. The computer system could display the data flag to the person via a display device, providing information about the call to the person. In some cases, the person is alerted to potential fraud or other malicious situations, based on the computer system displaying the data flag.

Figure 2:
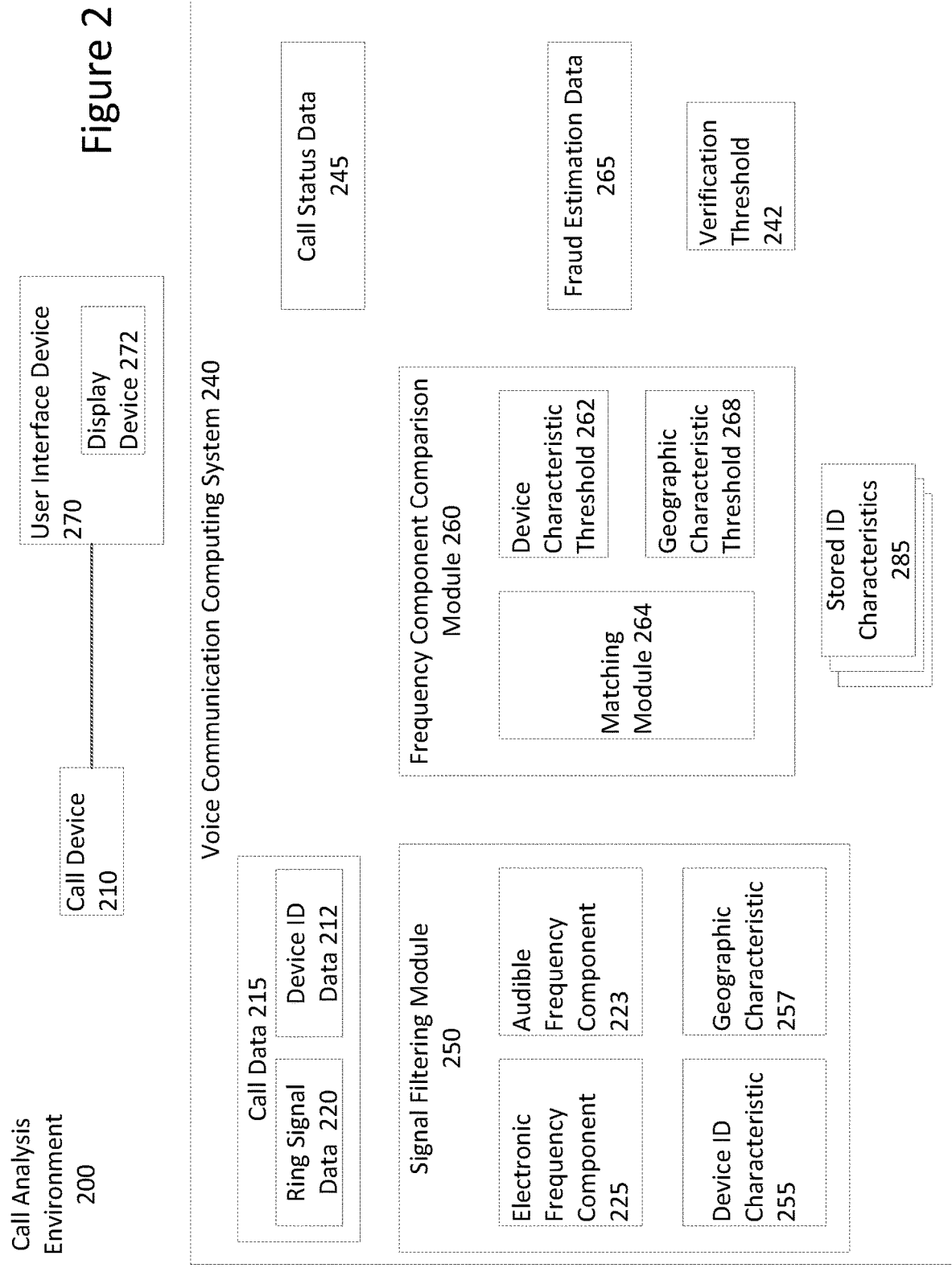
FIG. 2 is a diagram depicting an example of a call analysis environment in which a voice communication computing system may analyze a call, according to certain embodiments.

FIG. 2 depicts an example of a call analysis environment 200. The call analysis environment 200 can be included in, or otherwise in communication with, a call transmission environment, such as the call transmission environment 100 described in FIG. 1. In the call analysis environment 200, a VCCS 240 performs one or more techniques to analyze a call between a call device 210 and a user interface device 270. For example, the VCCS 240 analyzes one or more of call data 215, ring signal data 220, or device ID data 212. In FIG. 2, the call between the call device 210 and the user interface device 270 is associated with the call data 215, the ring signal data 220, and the device ID data 212. For example, the call data 215 may describe audio information, video information, or other information transmitted during the call. In addition, the device ID data 212 describes a telephone number, VoIP user ID, or other identification data that is associated with the call data 215. Responsive to receiving the call data 215, the VCCS 240 generates an indication that the device ID data 212 is unverified. In addition, the ring signal data 220 describes information about initiating the call, such as information indicating that the call is directed to the user interface device 270. In some cases, the ring signal data 220 indicates that the call is directed to a telephone number (or other identification) that is utilized by an automatic call distribution system to direct the call to the user interface device 270. In the call analysis environment 200, the call between the call device 210 and the user interface device 270 is relayed by one or more call relay systems, such as one or more of the call relay systems 130 described in FIG. 1.

In FIG. 2, the call device 210 can include a landline telephone, a mobile telephone, a computing device that utilizes VoIP calling techniques, or any other suitable device configured to send and receive calls. In addition, the user interface device 270 can include (or otherwise be associated with) a call device, one or more input devices, and one or more output devices, such as a display device 272. For example, the user interface device 270 may be a computing workstation that is used by a customer service representative, such as a person who is trained to receive and send calls and perform service tasks associated with calls. As an example, the user interface device 270 may be included in a customer service center that handles calls or other service tasks for an organization. In some cases, the example customer service center could be a distributed or remote center, such as customer service representatives who utilize computer workstations at home (or other distributed locations) to perform tasks for the example customer service center.

In some cases, the user interface device 270 is associated with an organization that is at high risk for being targeted by malicious actors. For instance, the example customer service representative who uses the user interface device 270 could handle calls for a financial institution, a medical facility, or another type of organization that could be targeted. In some cases, the example customer service representative who uses the user interface device 270 may frequently receive calls from entities attempting to perform fraud, identity theft, or other types of malicious actions. To perform tasks effectively and safely, the example customer service representative benefits by receiving, e.g., via the user interface device 270, information that accurately and quickly identifies calls that could potentially be associated with malicious actions.

In the call analysis environment 200, the VCCS 240 is configured to communicate with the user interface device 270. For instance, the VCCS 240 is configured to perform analysis of calls that are handled by the example customer service center, including calls received or sent via the user interface device 270 (or an associated call device). The VCCS 240 analyzes data associated with the call between the call device 210 and the user interface device 270. In some cases, the VCCS 240 receives the call data 215 and the ring signal data 220, such as during a relay activity (e.g., routing, transmission) of the call between the call device 210 and the user interface device 270. In addition, the VCCS 240 could receive the data 215 and 220 from an additional computing system, such as from the user interface device 270 or an automatic call distribution system that relays the call between the call device 210 and the user interface device 270.

In some implementations, the VCCS 240 determines one or more frequency components of the ring signal data 220, the call data 215, or both. For example, one or more of the call data 215 or the ring signal data 220 could include one or more frequency components that are modified by various devices that generate or relay the initiated call. The frequency components could be generated or introduced via the call device 210, the user interface device 270, the VCCS 240, or any other call relay system that relays the call associated with the ring signal data 220. For example, the ring signal data 220 could include audible frequency components, electronic frequency components, or a combination of audible and electronic frequency components. In addition, the audible or electronic frequency components of the ring signal data 220 could include patterns or transmission (or retransmission), such as patterns of dropped data packets.

In some cases, a signal filtering module 250 included in the VCCS 240 determines one or more frequency components of the ring signal data 220 (or the call data 215). For example, the signal filtering module 250 applies signal filtering techniques to the ring signal data 220, such as Kalman filtering, Weiner filtering, or other suitable filtering techniques. In some cases, the signal filtering module 250 applies isolation techniques to the one or more frequency components, such as by removing standardized ring information (e.g., ring data that conforms to a standard for initiating a call). Isolation techniques may, for example, preserve frequency components that are unique (or effectively unique) to the call device 210 and the particular call relay systems that provide the ring signal data 220, while removing frequency components that are present in additional calls from additional call devices.

Based on the applied filtering techniques, the signal filtering module 250 identifies one or more frequency components of the ring signal data 220, such as at least one electronic frequency component 225 or at least one audible frequency component 223. The electronic frequency component 225 may be inaudible to typical human hearing, as described elsewhere herein. In addition, the audible frequency component 223 may be detectable by typical human hearing, as described elsewhere herein. In some cases, the frequency components 225 and 223 are represented as data objects generated by the signal filtering module 250.

In addition, the VCCS 240 encodes one or more of the electronic frequency component 225 or the audible frequency component 223. In addition, the VCCS 240 generates one or more data objects representing the respective encoded data of the frequency components 225 or 223. For example, the signal filtering module 250 (or another component of the VCCS 240) applies one or more frequency encoding techniques to a frequency component, such as calculating a fast Fourier transform ("FFT"), a Mel-frequency cepstral coefficient ("MFCC"), or other suitable frequency encoding techniques. In some cases, the VCCS 240 generates a vector data object representing the encoded frequency component. For example, the electronic frequency component 225 may be encoded as vector data in a first data object, and the audible frequency component 223 may be encoded as vector data in a second data object.

In some implementations, the signal filtering module 250 determines at least one device ID characteristic, such as a device ID characteristic 255, based on one or more of the electronic frequency component 225 or the audible frequency component 223. In some cases, the signal filtering module 250 determines the device ID characteristic 255 based on analysis of the electronic frequency component 225, while omitting from the analysis the audible frequency component 223. In some cases, the audible frequency component 223 may be included in the analysis. Based on the analysis of at least the electronic frequency component 225, the signal filtering module 250 determines the device ID characteristic 255. In addition, the device ID characteristic 255 is unique (or effectively unique) to the call device 210 and the particular call relay systems that provided the ring signal data 220. In some cases, the VCCS 240 generates a vector data object representing a device ID characteristic. For example, the device ID characteristic 255 may be a vector data object that includes values representing the encoded data of the frequency components 225 or 223.

In some implementations, the signal filtering module 250 determines at least one geographical location characteristic, such as a geographic characteristic 257, based on one or more of the electronic frequency component 225 or the audible frequency component 223. In some cases, the signal filtering module 250 determines the geographic characteristic 257 based on analysis of the electronic frequency component 225, while omitting from the analysis the audible frequency component 223. In some cases, the signal filtering module 250 determines the geographic characteristic 257 based on analysis of a combination of the frequency components 225 and 223. Based on the analysis of at least the electronic frequency component 225, the signal filtering module 250 determines the geographic characteristic 257. In addition, the geographic characteristic 257 is unique (or effectively unique) to a particular geographical region, such as a country, a province, a geographical feature (e.g., ocean, mountain range) and the particular call relay systems located in the geographical region, e.g., call relay systems that provided the ring signal data 220. In some cases, the VCCS 240 generates a vector data object representing a geographical characteristic. For example, the geographic characteristic 257 may be a vector data object that includes values representing the encoded data of the frequency components 225 or 223.

In the call analysis environment 200, the VCCS 240 applies one or more verification techniques to the device ID characteristic 255 or the geographic characteristic 257. For example, the VCCS 240 compares one or more of the characteristics 255 or 257 to one or more stored ID characteristics 285. The stored ID characteristics 285 are associated with additional calls that are analyzed by the VCCS 140, such as additional calls handled by the user interface device 270 or the example customer service center. In some cases, the stored ID characteristics 285 are associated with additional calls having the device ID data 212. In addition, the stored ID characteristics 285 are associated with additional calls from a particular geographical region associated with the device ID data 212 (e.g., an area code, a country code). In some cases, some or all of the stored ID characteristics 285 may be indicated as verified, such as characteristics of previously received calls that are verified to have accurate call data (e.g., telephone numbers verified as not spoofed). In some cases, some or all of the stored ID characteristics 285 may be indicated as fraudulent, such as characteristics of previously received calls identified as having inaccurate call data (e.g., telephone numbers that were spoofed). In addition, one or more of the stored ID characteristics 285 can be encoded as vector data, e.g., vector data generated based on frequency encoding techniques. In FIG. 2, the stored ID characteristics 285 are depicted as being included in the VCCS 240, but other configurations are possible. For example, a VCCS could receive stored ID characteristics from a data repository, such as the device ID repository 180 described in regards to FIG. 1.

In FIG. 2, a frequency component comparison module 260 included in the VCCS 240 receives the stored ID characteristics 285 and one or more of the device ID characteristic 255 or the geographic characteristic 257. For example, the frequency component comparison module 260 compares the device ID characteristic 255 to the stored ID characteristics 285 (or a subset thereof) that are associated with additional calls having the device ID data 212. In addition, the frequency component comparison module 260 compares the geographic characteristic 257 to the stored ID characteristics 285 (or a subset thereof) that are associated with additional calls from the particular geographical region associated with the device ID data 212.

In some implementations, the frequency component comparison module 260 includes at least one matching module 264 that is configured to compare the stored ID characteristics 285 with one or more of the device ID characteristic 255 or the geographic characteristic 257. For example, the matching module 264 compares encoded frequency components of the device ID characteristic 255 or the geographic characteristic 257 to encoded frequency components of one or more of the stored ID characteristics 285. The matching module 264 includes, for instance, one or more trained machine-learning models that are configured to perform comparison techniques, such as by applying pattern matching, a support vector machine ("SVM"), or other machine-learning techniques for performing comparisons. In some cases, comparison techniques, including machine-learning comparison techniques, are performed with improved efficiency based on encoded frequency components that are represented via vector data.

Based on the comparison techniques, the frequency component comparison module 260 determines a similarity of the stored ID characteristics 285 with one or more of the device ID characteristic 255 or the geographic characteristic 257. In some cases, the frequency component comparison module 260 determines the similarity by calculating a cosine similarity or other suitable techniques. In addition, the frequency component comparison module 260 determines whether the similarity exceeds (or otherwise fulfills) a similarity threshold. For example, the frequency component comparison module 260 determines a first similarity between the device ID characteristic 255 and the stored ID characteristics 285. In addition, the frequency component comparison module 260 determines that the first similarity has a particular relation with a device characteristic threshold 262, such as exceeding or being within the threshold 262. Based on the relation with the device characteristic threshold 262, the frequency component comparison module 260 generates data indicating that the device ID characteristic 255 matches the stored ID characteristics 285 (e.g., the first similarity exceeds the threshold 262), or that the device ID characteristic 255 does not match the stored ID characteristics 285 (e.g., the first similarity is below the threshold 262), or another suitable indication (e.g., a similarity could not be determined for the device ID characteristic 255).

In addition, the frequency component comparison module 260 determines a second similarity between the geographic characteristic 257 and the stored ID characteristics 285. For instance, the frequency component comparison module 260 determines that the second similarity has a particular relation with a geographic characteristic threshold 268, such as exceeding or being within the threshold 268. Based on the relation with the geographic characteristic threshold 268, the frequency component comparison module 260 generates data indicating that the geographic characteristic 257 matches the stored ID characteristics 285 (e.g., the second similarity exceeds the threshold 268), or that the geographic characteristic 257 does not match the stored ID characteristics 285 (e.g., the second similarity is below the threshold 268), or another suitable indication (e.g., a similarity could not be determined for the geographic characteristic 257).

In some implementations, the VCCS 240 generates fraud estimation data 265 that describes ring signal data 220 (or the call data 215). The fraud estimation data 265 is generated based on comparisons performed by the frequency component comparison module 260. For example, responsive to determining that the device ID characteristic 255 matches the stored ID characteristics 285 (e.g., the first similarity exceeds the threshold 262), the fraud estimation data 265 indicates a relatively low likelihood of fraud, e.g., the frequency components of the ring signal data 220 match frequency components of additional calls that have the device ID data 212. In addition, responsive to determining that the geographic characteristic 257 matches the stored ID characteristics 285 (e.g., the second similarity exceeds the threshold 268), the fraud estimation data 265 indicates a relatively low likelihood of fraud, e.g., the frequency components of the ring signal data 220 match frequency components of additional calls from the particular geographical region associated with the device ID data 212. As an additional example, responsive to determining that the device ID characteristic 255 does not match the stored ID characteristics 285 (e.g., the first similarity does not exceed the threshold 262), the fraud estimation data 265 indicates a relatively high likelihood of fraud, e.g., the frequency components of the ring signal data 220 do not match frequency components of additional calls that have the device ID data 212. In addition, responsive to determining that the geographic characteristic 257 does not match the stored ID characteristics 285 (e.g., the second similarity does not exceed the threshold 268), the fraud estimation data 265 indicates a relatively high likelihood of fraud, e.g., the frequency components of the ring signal data 220 do not match frequency components of additional calls from the particular geographical region associated with the device ID data 212. In some cases, the fraud estimation data 265 could indicate that a likelihood of fraud is undetermined. For example, if the threshold 262 is exceeded and the threshold 268 is not exceeded, the fraud estimation data 265 could indicate that the call data 215 has an undetermined likelihood of fraud.

In FIG. 2, the VCCS 240 generates call status data 245 based on the fraud estimation data 265. In some cases, the VCCS 240 provides one or more of the call status data 245 or the fraud estimation data 265 to the user interface device 270. For example, the call status data 245 describes a status of the call between the call device 210 and the user interface device 270, such as a status of verified, potentially fraudulent, or unverified. Responsive to receiving the call status data 245, the user interface device 270 provides information about the call, such as a visual indication displayed via the display device 272. The displayed indication can describe the status of the call or include other information about the call. In some cases, the VCCS 240 generates the call status data 245 based on a comparison of the fraud estimation data 265 with a verification threshold 242. For example, if the fraud estimation data 265 exceeds (or otherwise fulfills) the verification threshold 242, e.g., a likelihood of fraud is above the threshold 242, the VCCS 240 may generate the call status data 245 indicating a potentially fraudulent status of the call. As an additional example, if the fraud estimation data 265 is below the verification threshold 262, the VCCS 240 may generate the call status data 245 indicating a verified status of the call, or the VCCS 240 may avoid generating the call status data 245.

In some cases, the example customer service representative using the user interface device 270 could receive more accurate information about the call between the call device 210 and the user interface device 270, based on the call status data 245. For example, if the fraud estimation data 265 indicates that the call is potentially fraudulent, the call status data 245 could include alert data. Responsive to receiving the call status data 245 with the example alert, the user interface device 270 displays the alert, e.g., via the display device 272, such that the example customer service representative could quickly realize that the caller could be asking for services that are fraudulent or otherwise malicious. As an additional example, if the fraud estimation data 265 indicates that the call is unverified (e.g., a likelihood of fraud is undetermined), the call status data 245 could include a request for additional information from the caller. Responsive to receiving the call status data 245 with the example request, the user interface device 270 displays one or more verification questions, which the example customer service representative could ask to potentially verify the caller. In some cases, the call status data 245 could describe actions for the user interface device 270, such as computer-implemented instructions for the user interface device 270 to disconnect the call, begin recording the call, redirect the call to an additional user interface device (e.g., used by customer service personnel trained to handle potential fraud), or other suitable actions by the user interface device 270.

In some implementations, the VCCS 240 generates or modifies additional data based on the call between the call device 210 and the user interface device 270. Responsive to determining that the device ID characteristic 255 or the geographic characteristic 257 does not match the stored ID characteristics 285, for instance, the VCCS 240 modifies the stored ID characteristics 285 or other ID characteristics. For example, if the call device 210 is verified as not associated with fraud, e.g., via verification information provided by the caller or another suitable verification technique, the VCCS 240 may modify the stored ID characteristics 285 to include one or more of the device ID characteristic 255 or the geographic characteristic 257. The modified stored ID characteristics 285 could identify the device ID characteristic 255 as being associated with the device ID data 212 (e.g., the caller is using a new phone). In some cases, the modified stored ID characteristics 285 could identify the geographic characteristic 257 as being associated with the particular geographical region associated with the device ID data 212. As an additional example, if the call device 210 is identified as a device being used for potentially fraudulent actions, the VCCS 240 may modify a set of additional stored ID characteristics to include one or more of the device ID characteristic 255 or the geographic characteristic 257, such as additional stored ID characteristics that describe known or suspected fraudulent devices.

FIG. 3 is a flow chart depicting an example of a process 300 for call analysis, such as identification of a call device based on associated frequency components. In some embodiments, such as described in regards to FIGS. 1-2, a computing device executing a VCCS implements operations described in FIG. 3 by executing suitable program code. For illustrative purposes, the process 300 is described with reference to the examples depicted in FIGS. 1-2. Other implementations, however, are possible.

At block 310, the process 300 involves receiving a ring signal that originates from a call device. The ring signal may be received by a VCCS, such as the VCCS 240. In some cases, one or more of the call device or the ring signal is associated with device identification data, such as a telephone number, a VoIP account ID, or other identification data. For example, the VCCS 240 receives the ring signal data 220 that is from the call device 210. The ring signal data 220 is associated with the device ID data 212. In addition, the call device 210 is associated with the device ID data 212. In some cases, the association of the device identification data with the call device or the ring signal may be indicated as unverified, such as an indication that it is unknown (e.g., upon initially receiving the ring signal) whether the device identification is spoofed. For example, responsive to receiving the call data 215, the VCCS 240 could indicate that the device ID data 212 is unverified, such as during a time period after initially receiving the call and prior to receiving the fraud estimation data 265 (or while other call analysis is being performed).

At block 320, the process 300 involves one or more of an audible frequency component or an electronic frequency component. In some cases, the VCCS identifies at least one audible frequency component and at least one electronic frequency component. For example, the signal filtering module 250 in the VCCS 240 identifies the electronic frequency component 225 and the audible frequency component 223. The at least one audible frequency component may be detectable by typical human hearing (e.g., about 20 Hz to about 20 kHz). Examples of audible frequency components include frequency components determined from speech from the caller who is using the call device, background speech (e.g., from people not using the call device), vehicle sounds, sounds from weather, or other audible sounds, including audible sounds that are not intentionally included in the call by the caller. In addition, the at least one electronic frequency component may be inaudible to typical human hearing (e.g., below about 20 Hz or above about 20 kHz). Examples of electronic frequency components include frequency components determined from oscillations of electrical values, signal clipping, signal filtering, or other electronic signals that are generated by configurations of hardware or software. In some cases, one or more of the audible frequency component or the electronic frequency component is encoded as vector data.

At block 330, the process 300 involves identifying one or more of a device ID characteristic or a geographic characteristic. In some cases, the VCCS identifies at least one device ID characteristic, at least one geographic characteristic, or combinations of one or more device ID characteristics and one or more geographic characteristics. Identifying the device ID characteristic or the geographic characteristic may be based on the at least one electronic frequency component. In addition, identifying the device ID characteristic or the geographic characteristic may be based on the at least one audible frequency component. For example, the signal filtering module 250 in the VCCS 240 identifies the device ID characteristic 255 and the geographic characteristic 257 based on one or more of the electronic frequency component 225 or the audible frequency component 223. In some cases, one or more of the device ID characteristic or the geographic characteristic is encoded as vector data.

At block 340, the process 300 involves identifying at least one stored ID characteristic. In some cases, the VCCS may identify the at least one stored ID characteristic based on an association with the device ID data. For example, the stored ID characteristic may be identified from additional calls having the device ID data, or additional calls from a particular geographical region associated with the device ID data. The VCCS 240 identifies, for example, the stored ID characteristics 285 based on the device ID data 212. In some cases, one or more stored ID characteristics are encoded as vector data.

At block 350, the process 300 involves generating fraud estimation data based on a comparison of the at least one device ID characteristic with the at least one stored ID characteristic. At block 355, the process 300 involves generating fraud estimation data based on a comparison of the at least one geographic characteristic with the at least one stored ID characteristic. The fraud estimation data may be associated with the ring signal, or a call associated with the ring signal. In some cases, the VCCS may generate the fraud estimation data via one or more machine-learning models trained to perform comparison techniques. For example, the matching module 264 in the VCCS 240 compares one or more of the device ID 255 of the geographic characteristic 257 to the stored ID characteristics 285. In addition, the VCCS 240 generates the fraud estimation data 265 based on the comparison data (or other output) of the matching module 264.

In some cases, the VCCS may generate the fraud estimation data based on a similarity of the stored ID characteristic with the device ID characteristic or the geographic characteristic. For example, based on the stored ID characteristic and the device ID characteristic having a first similarity that exceeds (or has another relationship with) a device characteristic threshold, the fraud estimation data may indicate a first likelihood of fraud associated with the ring signal. In addition, based on the stored ID characteristic and the geographic characteristic having a second similarity that exceeds (or has another relationship with) a geographic characteristic threshold, the fraud estimation data may indicate a second likelihood of fraud associated with the ring signal. For example, responsive to determining that the device ID characteristic 255 and the stored ID characteristics 285 have a first similarity with a particular relationship to the device characteristic threshold 262, the VCCS 240 generates (or modifies) the fraud estimation data 265 to indicate a first likelihood of fraud for the ring signal data 220. In addition, responsive to determining that the geographic characteristic 257 and the stored ID characteristics 285 have a second similarity with a particular relationship to the geographic characteristic threshold 268, the VCCS 240 generates (or modifies) the fraud estimation data 265 to indicate a second likelihood of fraud for the ring signal data 220.

At block 360, the process 300 involves providing the fraud estimation data to one or more user interface devices. In some cases, the VCCS may provide the fraud estimation data to a user interface device that is used by a customer service representative, such as the example computer workstation described in regards to the user interface device 270. In addition, the VCCS may provide the fraud estimation data to one or more additional user interface devices. For example, the VCCS 240 could provide the fraud estimation data 265 (or the call status data 245) to one or more additional user interface devices, such as sending a message to an email address or a telephone number. In some cases, the additional user interface devices may correspond to an account, e.g., a user account, that also corresponds to the device ID data 212. A person who owns or otherwise is associated with the additional user interface devices may benefit from receiving a message indicating that their information (e.g., the device ID data 212, the user account) might be targeted for potential malicious activities. In some cases, the provided fraud estimation data may indicate multiple likelihoods of fraud, such as the first and second likelihoods described in regards to block 350. In addition, the provided fraud estimation data may indicate a combined likelihood of fraud, such as alert data (or another indication) that is generated based on a combination of the first and second likelihoods. In some cases, the fraud estimation data may be included in call status data that is provided to the one or more user interface devices.

Figure 4:
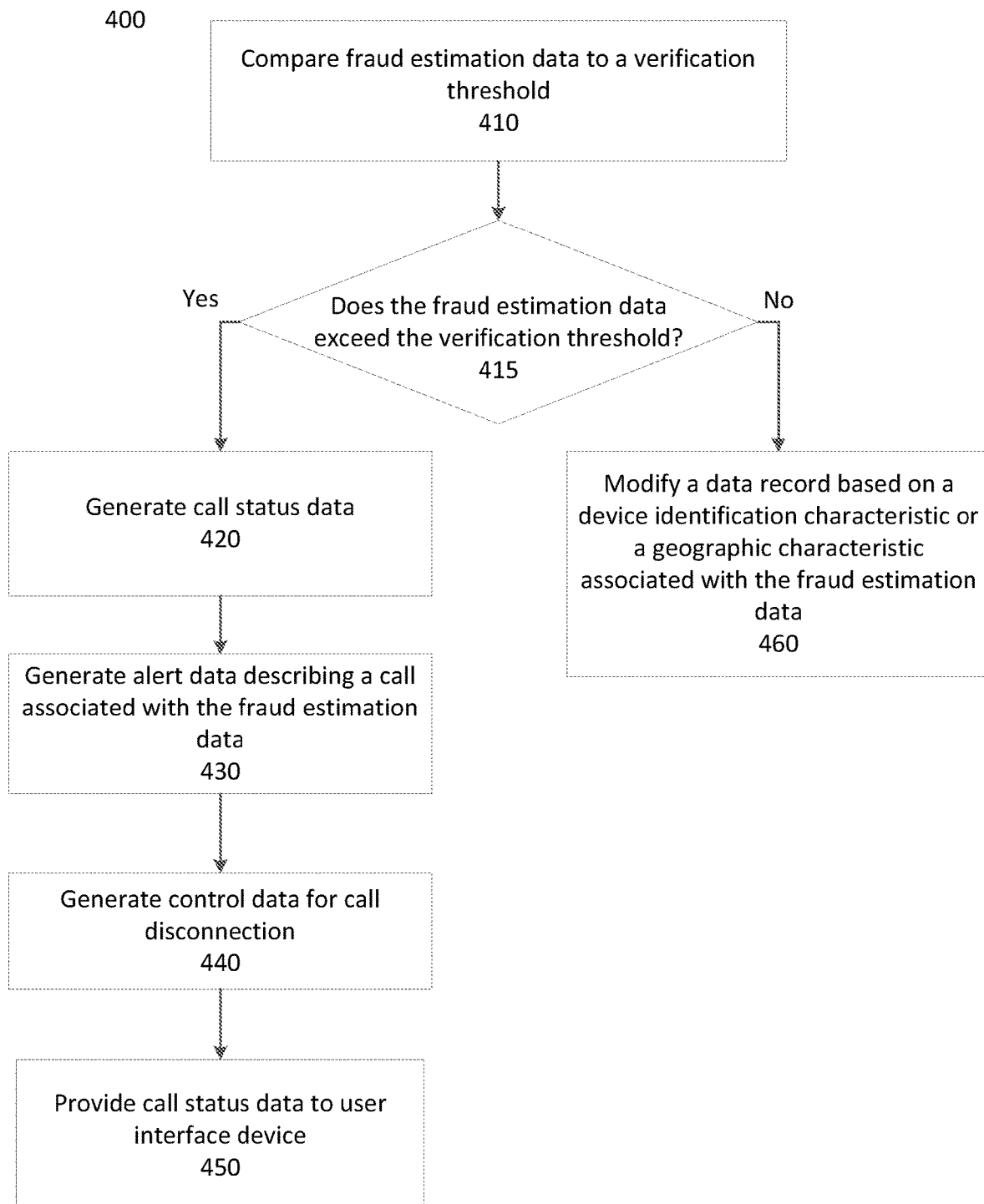
FIG. 4 is a flow chart depicting an example of a process for generating data based on fraud estimation data, such as fraud estimation data determined during call analysis, according to certain embodiments.

FIG. 4 is a flow chart depicting an example of a process 400 for generating data based on fraud estimation data, such as fraud estimation data determined during call analysis. In some embodiments, such as described in regards to FIGS. 1-3, a computing device executing a VCCS implements operations described in FIG. 4 by executing suitable program code. For illustrative purposes, the process 400 is described with reference to the examples depicted in FIGS. 1-3. Other implementations, however, are possible.

At block 410, the process 400 involves comparing fraud estimation data to a verification threshold, such as a comparison performed by a VCCS. In some cases, the fraud estimation data may be generated by the VCCS, such as the fraud estimation data 265 generated by the VCCS 240. For example, the fraud estimation data may be generated by the VCCS as generally described in regards to FIG. 3.

At block 415, the process 400 involves determining a relation between the verification threshold and the fraud estimation data, such as a relation that is determined based on the comparison. Responsive to the comparison, the VCCS may determine that the fraud estimation data exceeds the verification threshold, is below the verification threshold, or is within a particular range of the verification threshold. For example, the VCCS 240 determines that the fraud estimation data 265 has a value (e.g., a probability, a percentage) that exceeds, is below, or is within a particular range of the verification threshold 242.

If operations related to block 415 determine that the fraud estimation data exceeds the verification threshold, the process 400 may proceed to another block, such as one or more of blocks 420, 430, 440, or 450.

At block 420, the process 400 involves generating call status data. The call status data may include some or all of the fraud estimation data. In some cases, the call status data indicates a combined likelihood of fraud, such as alert data (or other indication) that is generated based on a combination of multiple likelihoods of fraud. For example, based on the fraud estimation data 265, the VCCS 240 generates the call status data 245 describing at least one likelihood of whether the ring signal data 220 is associated with fraud. In some cases, the call status data 245 could indicate a first likelihood of fraud based on whether a similarity of the device ID characteristic 255 and the stored ID characteristics 285 exceeds (or does not exceed) the device characteristic threshold 262. In addition, the call status data 245 could indicate a second likelihood of fraud based on whether a similarity of the geographic characteristic 257 and the stored ID characteristics 285 exceeds (or does not exceed) the geographic characteristic threshold 268. In some implementations, the call status data may include data describing a request for more information. For example, if the fraud estimation data 265 indicates that a likelihood of fraud is undetermined, the call status data 245 may include a request for additional information from the caller using the call device 210.

At block 430, the process 400 involves generating alert data. The alert data may describe a call that is associated with the fraud estimation data, such as the call between the call device 210 and the user interface device 270. In some cases, the call status data may be generated or modified to include the alert data. For example, the VCCS 240 could generate alert data that is included in the call status data 245.

At block 440, the process 400 involves generating control data regarding the call associated with the fraud estimation data. The control data may include one or more commands to disconnect the call or to perform another suitable action for the call. For example, the VCCS 240 could generate a disconnection command that is included in the call status data 245.

At block 450, the process 400 involves providing the call status data to one or more user interface devices. In some cases, the VCCS may provide the call status data to a user interface device that is used by a customer service representative, or to one or more additional user interface devices. In addition, the call status data may configure the user interface device to perform one or more actions. For example, the VCCS 240 provides the call status data 245 to one or more of the user interface device 270 or an additional user interface device corresponding to a user account that also corresponds to the device ID data 212. The call status data 245 configures the user interface device 270 (or the additional user interface device) to display, e.g., via the display device 272, the alert data, the request for verification information from the caller. In some cases, the call status data 245 configures the user interface device 270 (or the additional user interface device) to perform one or more additional actions, such as disconnecting the call with the call device 210.

If operations related to block 415 determine that the fraud estimation data does not exceed the verification threshold, the process 400 may proceed to another block, such as block 460, at least.

At block 460, the process 400 involves generating or modifying data that is associated with the fraud estimation data, such as one or more data records. In some cases, the VCCS generates or modifies a data record based on one or more of a device ID characteristic or a geographic characteristic. For example, the VCCS may generate or modify a stored ID characteristic for device ID data associated with the call, responsive to determining that the call is not fraudulent (e.g., the caller provided alternative verification information). In addition, the VCCS may generate or modify a stored ID characteristic that describes a known or suspected fraudulent call device, responsive to determining that the call is potentially fraudulent (e.g., verification information was not available). For instance, responsive to determining that the device ID characteristic 255 or the geographic characteristic 257 does not match the stored ID characteristics 285, the VCCS 240 modifies the stored ID characteristics 285 or an additional stored ID characteristic. In some cases, generating or modifying a stored ID characteristic may involve including the device ID characteristic or the geographic characteristic in the stored ID characteristic, such as adding the device ID characteristic 255 or the geographic characteristic 257 to the stored ID characteristics 285.

Figure 5:
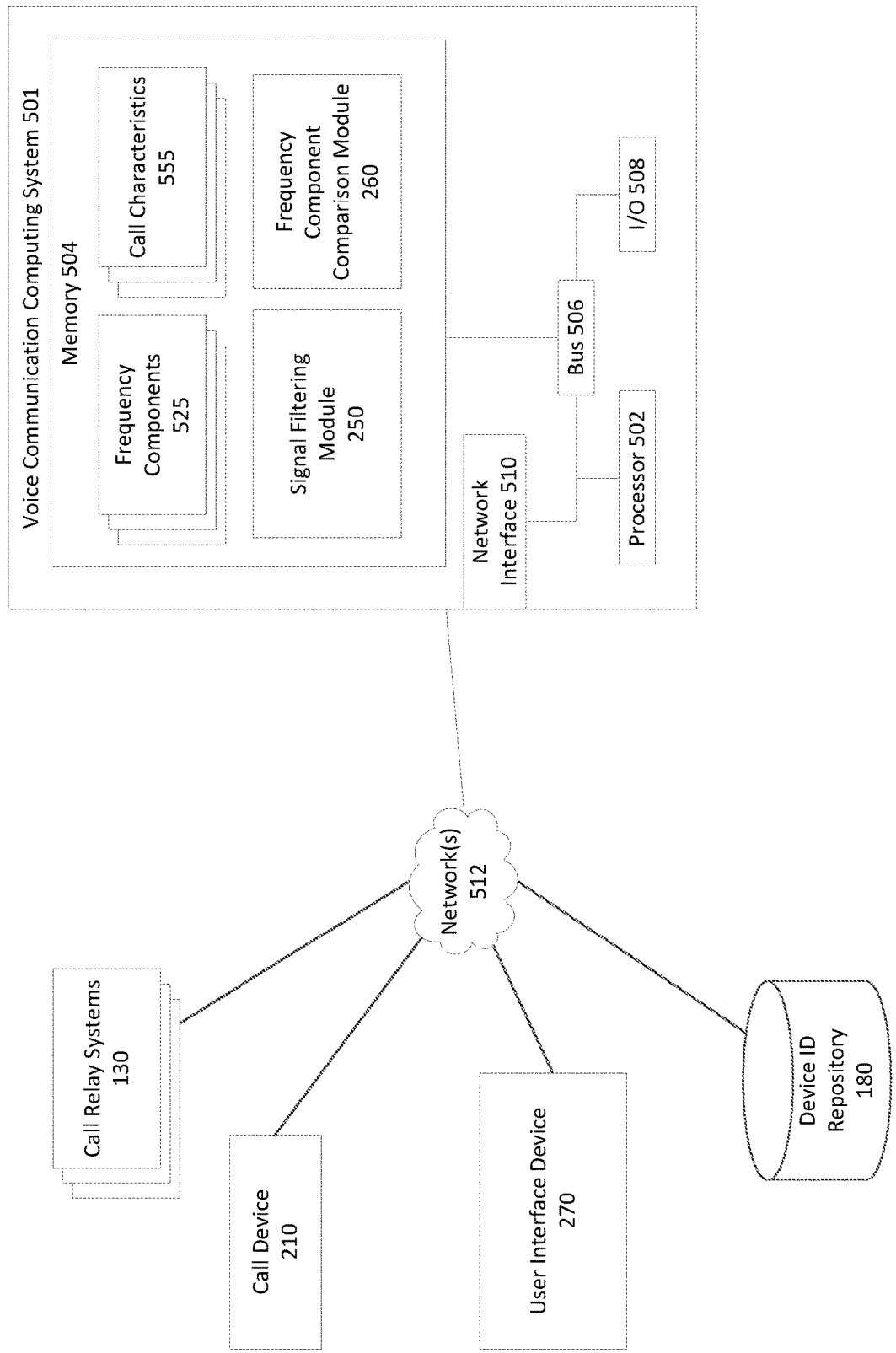
FIG. 5 is a block diagram depicting an example of a computing system for implementing a voice communication computing system, according to certain embodiments.

Any suitable computing system or group of computing systems can be used for performing the operations described herein. For example, FIG. 5 is a block diagram depicting a computing device that can be configured to implement a VCCS, according to certain embodiments.

The depicted example of a VCCS 501 includes one or more processors 502 communicatively coupled to one or more memory devices 504. The processor 502 executes computer-executable program code or accesses information stored in the memory device 504. Examples of processor 502 include a microprocessor, an application-specific integrated circuit ("ASIC"), a field-programmable gate array ("FPGA"), or other suitable processing device. The processor 502 can include any number of processing devices, including one.

The memory device 504 includes any suitable non-transitory computer-readable medium for storing frequency components 525 (e.g., the electronic or audible frequency components 225 or 223), call characteristics 555 (e.g., the device ID or geographic characteristics 255 or 257), the signal filtering module 250, the frequency component comparison module 260, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The VCCS 501 may also include a number of external or internal devices such as input or output devices. For example, the VCCS 501 is shown with an input/output ("I/O") interface 508 that can receive input from input devices or provide output to output devices. A bus 506 can also be included in the VCCS 501. The bus 506 can communicatively couple one or more components of the VCCS 501.

The VCCS 501 executes program code that configures the processor 502 to perform one or more of the operations described above with respect to FIGS. 1-4. The program code includes operations related to, for example, one or more of the frequency components 525, the call characteristics 555, the signal filtering module 250, the frequency component comparison module 260, or other suitable applications or memory structures that perform one or more operations described herein. The program code may be resident in the memory device 504 or any suitable computer-readable medium and may be executed by the processor 502 or any other suitable processor. In some embodiments, the program code described above, the frequency components 525, the call characteristics 555, the signal filtering module 250, and the frequency component comparison module 260 are stored in the memory device 504, as depicted in FIG. 5. In additional or alternative embodiments, one or more of the frequency components 525, the call characteristics 555, the signal filtering module 250, the frequency component comparison module 260, and the program code described above are stored in one or more memory devices accessible via a data network, such as a memory device accessible via a cloud service.

The VCCS 501 depicted in FIG. 5 also includes at least one network interface 510. The network interface 510 includes any device or group of devices suitable for establishing a wired or wireless data connection to one or more data networks 512. Non-limiting examples of the network interface 510 include an Ethernet network adapter, a modem, and/or the like. In the VCCS 501, the network interface 510 can be configured to receive call data (or a copy of call data), such as telephone calls or VoIP calls. The VCCS 501 is able to communicate with one or more of the device ID repository 180, the user interface device 270, the call device 210, or the call relay systems 130 using the network interface 510. In some cases, the user interface device 270, the call relay systems 130, or the call device 210 may be connected to the VCCS 501 via the networks 512. In some cases, the user interface device 270, the call relay systems 130, or the call device 210 may be connected to each other via the networks 512, and the VCCS 501 may receive call data via an additional system, such as an automatic call distribution system that handles call data related to one or more of the user interface device 270, the call relay systems 130, or the call device 210.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification, discussions utilizing terms such as "processing," "computing," "calculating," "determining," "identifying," or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be established on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of identifying a call device, the method including operations executed by a processor, the operations comprising:
   receiving, by a voice communications computer system ("VCCS"), a ring signal originating from a call device, the call device associated with device identification data;
   identifying, by the VCCS, a combination of frequency components associated with the ring signal;
   identifying a geographical identification characteristic based on the combination of frequency components;
   identifying a stored identification characteristic associated with the device identification data;
   generating, based on a comparison of the geographical identification characteristic to the stored identification characteristic, fraud estimation data; and
   providing the fraud estimation data to an additional computing system configured to communicate with the VCCS.

2. The method of claim 1, further comprising:
   comparing the fraud estimation data to a verification threshold; and
   responsive to the fraud estimation data exceeding the verification threshold, generating call status data, wherein the call status data configures the additional computing system to perform one or more of:
   configuring a display device to display data describing requested verification data,
   configuring the display device to display alert data describing the call device associated with the device identification data, or
   disconnecting a call associated with the ring signal.

3. The method of claim 1, further comprising:
   comparing the fraud estimation data to a verification threshold; and
   responsive to the verification threshold exceeding the fraud estimation data, modifying a data record associated with the device identification data to include the geographical identification characteristic.

4. The method of claim 1, wherein identifying the combination of frequency components is based on filtering techniques performed by the VCCS.

5. The method of claim 1, further comprising encoding the geographical identification characteristic to a vector data object.

6. The method of claim 1, wherein the comparison of the geographical identification characteristic to the stored identification characteristic is performed via a trained machine-learning module configured for performing comparison techniques.

7. The method of claim 1, wherein generating the fraud estimation data is based in part on comparing, to a geographical characteristic threshold, a similarity of the stored identification characteristic and the geographical identification characteristic.

8. The method of claim 1, further comprising identifying a device identification characteristic based on the combination of frequency components,
   wherein generating the fraud estimation data is further based on an additional comparison of the device identification characteristic to the stored identification characteristic.

9. A system for identifying a call device, the system comprising: a voice communications computer system ("VCCS") configured for:
   receiving, by a ring signal originating from a call device, the call device associated with device identification data;
   identifying, by the VCCS, a combination of frequency components associated with the ring signal;
   identifying a geographical identification characteristic based on the combination of frequency components;
   identifying a stored identification characteristic associated with the device identification data;
   generating, based on a comparison of the geographical identification characteristic to the stored identification characteristic, fraud estimation data; and
   providing the fraud estimation data to an additional computing system configured to communicate with the VCCS.

10. The system of claim 9, wherein the VCCS is further configured for:
    comparing the fraud estimation data to a verification threshold; and
    responsive to the fraud estimation data exceeding the verification threshold, generating call status data, wherein the call status data configures the additional computing system to perform one or more of:
    configuring a display device to display data describing requested verification data,
    configuring the display device to display alert data describing the call device associated with the device identification data, or
    disconnecting a call associated with the ring signal.

11. The system of claim 9, wherein the VCCS is further configured for:
    comparing the fraud estimation data to a verification threshold; and
    responsive to the verification threshold exceeding the fraud estimation data, modifying a data record associated with the device identification data to include the geographical identification characteristic.

12. The system of claim 9, wherein identifying the combination of frequency components is based on filtering techniques performed by the VCCS.

13. The system of claim 9, wherein the VCCS is further configured for encoding the geographical identification characteristic to a vector data object.

14. The system of claim 9, wherein the comparison of the geographical identification characteristic to the stored identification characteristic is performed via a trained machine-learning module configured for performing comparison techniques.

15. The system of claim 9, wherein generating the fraud estimation data is based in part on comparing, to a geographical characteristic threshold, a similarity of the stored identification characteristic and the geographical identification characteristic.

16. The system of claim 9, wherein the VCCS is further configured for identifying a device identification characteristic based on the combination of frequency components,
wherein generating the fraud estimation data is further based on an additional comparison of the device identification characteristic to the stored identification characteristic.

17. A non-transitory computer-readable medium embodying program code for identifying a call device, wherein, when executed by a processor, the program code causes the processor to perform operations comprising:
receiving, by a voice communications computer system ("VCCS"), a ring signal originating from a call device, the call device having an unverified association with device identification data;
identifying, by the VCCS, a combination of frequency components associated with the ring signal;
identifying a geographical identification characteristic based on the combination of frequency components;
identifying a stored identification characteristic associated with the device identification data;
generating, based on a comparison of the geographical identification characteristic to the stored identification characteristic, fraud estimation data; and
providing the fraud estimation data to an additional computing system configured to communicate with the VCCS.

18. The non-transitory computer-readable medium of claim 17, wherein the program code causes the processor to perform operations further comprising:
comparing the fraud estimation data to a verification threshold; and
responsive to the fraud estimation data exceeding the verification threshold, generating call status data, wherein the call status data configures the additional computing system to perform one or more of:
configuring a display device to display data describing requested verification data,
configuring the display device to display alert data describing the call device associated with the device identification data, or
disconnecting a call associated with the ring signal.

19. The non-transitory computer-readable medium of claim 17, wherein the program code causes the processor to perform operations further comprising:
comparing the fraud estimation data to a verification threshold; and
responsive to the verification threshold exceeding the fraud estimation data, modifying a data record associated with the device identification data to include the geographical identification characteristic.

20. The non-transitory computer-readable medium of claim 17, wherein the program code causes the processor to perform operations further comprising:
identifying a device identification characteristic based on the combination of frequency components,
wherein generating the fraud estimation data is further based on an additional comparison of the device identification characteristic to the stored identification characteristic.

* * * * *